(12) United States Patent
Gong (10) Patent No.: US 8,923,192 B2
(45) Date of Patent: Dec. 30, 2014

(54) METHOD FOR SERVICE DATA TRANSMISSION, A RECEIVER, A MOBILE TERMINAL, A TRANSMITTER AND A BASE STATION

(75) Inventor: Ming Gong, Guangdong (CN)

(73) Assignee: ZTE Corporation, Shenzhen (CN)

( * ) Notice: Subject to any disclaimer, the term of this patent is extended or adjusted under 35 U.S.C. 154(b) by 165 days.

(21) Appl. No.: 13/259,940

(22) PCT Filed: Oct. 19, 2010

(86) PCT No.: PCT/CN2010/077849
§ 371 (c)(1),
(2), (4) Date: May 29, 2012

(87) PCT Pub. No.: WO2011/143896
PCT Pub. Date: Nov. 24, 2011

(65) Prior Publication Data
US 2012/0236802 A1   Sep. 20, 2012

(30) Foreign Application Priority Data

May 17, 2010   (CN) .......................... 2010 1 0184395

(51) Int. Cl.
 *H04W 4/00* (2009.01)
 *H04L 5/00* (2006.01)
(52) U.S. Cl.
 CPC ............ *H04L 5/0094* (2013.01); *H04L 5/0042* (2013.01); *H04L 5/0096* (2013.01)
 USPC ............................ 370/328; 370/252; 455/109
(58) Field of Classification Search
 USPC ............. 370/328–352, 400–498; 455/109, 73
 See application file for complete search history.

(56) References Cited

U.S. PATENT DOCUMENTS

| 4,360,795 A * | 11/1982 | Hoff ............................... 340/943 |
| 7,047,006 B2 | 5/2006 | Classon et al. |
| 2006/0014506 A1 | 1/2006 | Haartsen |
| 2008/0227475 A1* | 9/2008 | Suemitsu et al. ............. 455/513 |
| 2008/0247480 A1 | 10/2008 | Ionescu et al. |
| 2009/0029710 A1* | 1/2009 | Ochiai et al. .................. 455/450 |
| 2013/0157584 A1* | 6/2013 | Tekin et al. ...................... 455/73 |

FOREIGN PATENT DOCUMENTS

| CN | 1926842 A1 | 3/2007 |
| CN | 101267414 A1 | 9/2008 |
| JP | 4095665 B2 | 6/2008 |

\* cited by examiner

*Primary Examiner* — Iqbal Zaidi
(74) *Attorney, Agent, or Firm* — Christopher L. Parmelee; Walker & Jocke (57) ABSTRACT

The present invention discloses a method for service data transmission, a receiver, a mobile terminal, a transmitter and a base station. In the above method, a receiver of a mobile terminal receives a control signal sent by a base station, wherein the control signal is used for indicating more than one subcarriers allocated to the mobile terminal and the more than one subcarriers are used for service data transmission; it is judged whether the difference between the highest frequency $FRE_{High}$ and the lowest frequency $FRE_{Low}$ in the more than one subcarriers exceeds a threshold value $TH_B$; if not exceed, then the receiver receives service data using a narrowband mode, otherwise receives the service data using a broadband mode. By way of the technical solution of the present invention, the signal bandwidth processed by the receiver can become narrow, the digital sampling rate becomes lower, the calculation amount of the FFT module and relevant storage are reduced, thus achieving the effect of reducing the power consumption overhead of the mobile terminal.

18 Claims, 5 Drawing Sheets

METHOD FOR SERVICE DATA TRANSMISSION, A RECEIVER, A MOBILE TERMINAL, A TRANSMITTER AND A BASE STATION

FIELD OF THE INVENTION

The present invention relates to the communication field, and in particular to a method for service data transmission, a receiver, a mobile terminal, a transmitter and a base station.

BACKGROUND OF THE INVENTION

With the demand increase of the mobile communication users, high spectrum efficiency becomes one of the main requirements of the mobile communication system, and orthogonal frequency division multiplexing (OFDM) is just one main support physical layer technology. In the corresponding Orthogonal Frequency Division Multiplexing Access (OFDMA) under the multi-user environment, more than one mobile terminals can multiplex spectrum resources at the divided subcarrier resource level, for example, the downlink of the long-term evolution (LTE) system uses such OFDMA technology.

Figure 1:
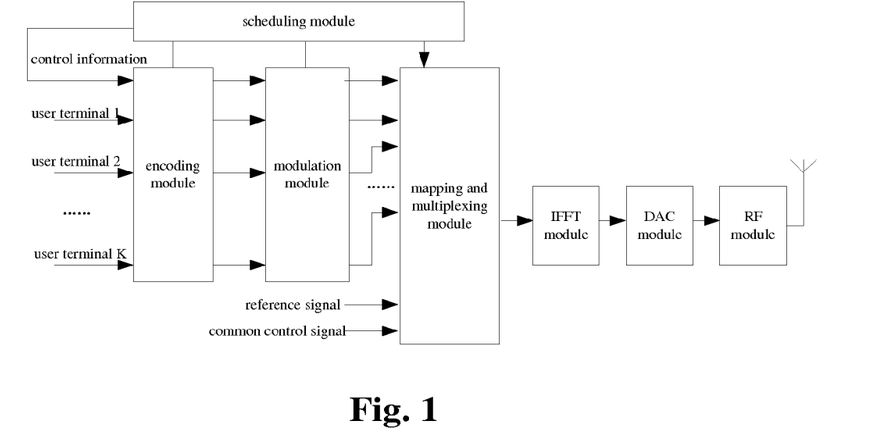
FIG. 1 is a structural block diagram of a broadband wireless OFDMA base station transmitter according to relevant art.

FIG. 1 shows a structural block diagram of a broadband wireless OFDMA base station transmitter. The data of each user are encoded and modulated, and the base station maps the signals in the broadband frequency range by multi-user scheduling. By using OFDMA technology, the broadband spectrum can form N parallel subcarriers to carry data, for example N is 2048, and the base station can perform optimized scheduling for each user over these N subcarriers.

As to one certain user, the base station will generally obtain the information about the wireless channel from the base station to one certain user (i.e. mobile terminal) via the channel quality feedback of the mobile terminal or using the reciprocity of the uplink/downlink channel of the time division duplex (TDD), and the base station can allocate the subcarriers which are suitable for the receiving by a user to this user (the fading is relatively small) so as to achieve the object of improving user throughput. The base station can allocate consecutive subcarriers to the user and can also allocate non-consecutive subcarriers to the user.

Figure 2:
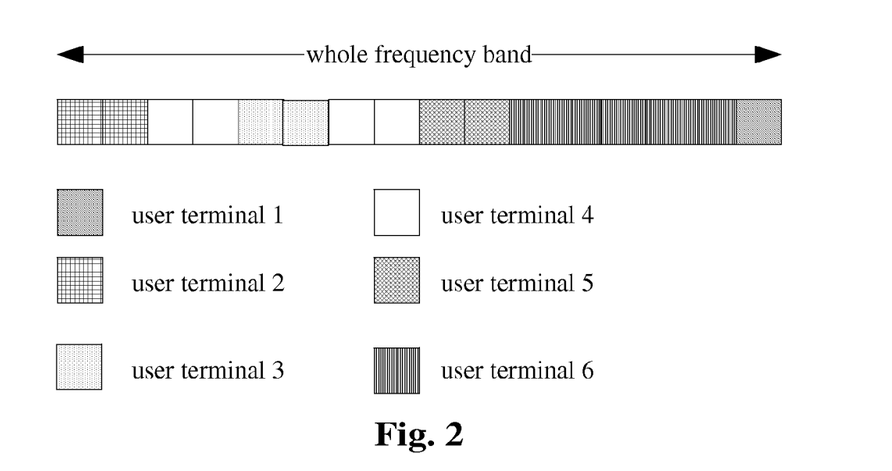
FIG. 2 is a schematic diagram of subcarrier allocation within all-bandwidth frequency band according to relevant art.

FIG. 2 shows an example of subcarrier allocation within one frequency band. In a base station transmitter, a part of frequency domain subcarriers are used as reference training signals, and what is sent is confirmed known signals, and another part of frequency domain subcarriers are used for carrying service data to be transmitted. The reference signal subcarriers can assist the receiver to perform channel estimation so as to complete the coherent demodulation of data.

In addition to this, some subcarriers carry relevant control channel information, and the base station uses relevant control channels to inform each user of the scheduling information and the parameters (such as encoding rate, modulation mode, etc.) of each service channel timely. In addition, some common control channels, such as synchronization signal, broadcast channel, etc. will also occupy a certain amount of frequency domain subcarrier resources and they are mapped in the system frequency band together with the subcarriers of other channels without overlap.

After mapping, each symbol in the whole frequency band will do Inverse Fast Fourier Transform (IFFT), and the frequency domain signals are transformed into time domain. After being added with a cyclic prefix as the protection of anti-OFDM inter-symbol interference, the signals are transmitted to the whole cell from the antennae via modules such as Digital Analog Converter (DAC) module, radio frequency (RF) module, etc.

Figure 3:
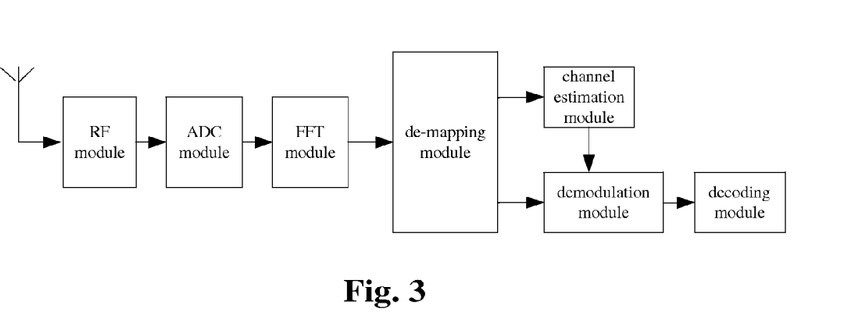
FIG. 3 is a structural block diagram of a receiver of a mobile terminal according to relevant art.

In the OFDMA system, each mobile terminal receives downlink signals, and the block diagram of the receiver of the mobile terminal is as shown in FIG. 3. The air port signals are transformed onto the baseband by the radio frequency module RF and sampled as baseband signals by the Analog Digital Converter ADC module, and the cyclic prefix is removed over time domain, and then the time domain OFDM symbols are sampled to complete Fourier FFT transform to obtain the data of frequency domain; and in the de-mapping module, each mobile terminal takes out the subcarriers which belong to itself and relevant reference subcarrier signals. There is special control channel or control signaling in the broadband system for informing each user of the location of the time frequency resource allocated thereto by the base station. In the following, the signal estimation module uses the reference subcarrier signals to estimate the frequency domain subcarrier channel from the base station to the user; and the demodulation module carries out coherent demodulation on the data subcarrier signals according to the channel estimation value to obtain corresponding data bit judgment value. The same is sent to the decoding module for decoding and finally the data information is obtained.

In the conventional receiver used for broadband system, the modules such as radio frequency module RF, analog digital converter ADC module, Fourier transform module FFT, etc. all work under high data rate mode, and the user will carry out receiving with rather large power consumption. However, most of the time, the user does not have high speed data service, for example, the effective data bandwidth of this user only occupies 180 kHz, and the conventional receiver used for broadband system will still receive this signal by manner of performing the receiving over all the bandwidth, and the receiver still remains in the receiving state with rather high processing load, which will consume quite a lot of battery energy undoubtedly. As to the portable equipment of the user, how long the working time of the battery is will closely impact the user experience of the mobile communication products.

SUMMARY OF THE INVENTION

One main object of the present invention is to provide a method for service data transmission, a receiver, a mobile terminal, a transmitter, and a base station so as to solve the above problems.

A method for service data transmission is provided according to one aspect of the present invention, which comprises: receiving, by a receiver of a mobile terminal, a control signal sent from a base station, wherein the control signal is used for indicating more than one subcarriers allocated to the mobile terminal and the more than one subcarriers are used for transmitting service data; judging whether the difference between the highest frequency $FRE_{High}$ and the lowest frequency $FRE_{Low}$ in the more than one subcarriers exceeds a threshold value $TH_B$; and if the difference does not exceed the threshold value $TH_B$, then receiving, by the receiver, the service data using a narrowband mode, otherwise receiving, by the receiver, the service data using a broadband mode.

A receiver located in a mobile terminal is provided according to another aspect of the present invention, which receiver comprises: a radio frequency module and a receiver control module, wherein the radio frequency module is configured to receive a control signal sent from a base station which a mobile terminal accesses, and output the same to a receiver control module, and configured to receive subsequent service data from the base station, wherein the control signal is used for indicating more than one subcarriers allocated to the mobile terminal and the more than one subcarriers are used for transmitting service data; and the receiver control module is configured to judge whether the different between the highest frequency $FRE_{High}$ and the lowest frequency $FRE_{Low}$ in the more than one subcarriers exceeds a threshold value $TH_B$, if the difference does not exceed the threshold value $TH_B$, then receive the service data using a narrowband mode, otherwise receive the service data using a broadband mode.

A mobile terminal including the above receiver is provided according to another aspect of the present invention.

A transmitter is provided according to yet another aspect of the present invention, which comprises: an encoding mode, a commissioning mode, a mapping and multiplexing module, an inverse Fourier transform module, a digital analog converter module, a radio frequency module and a scheduling module, wherein the scheduling module comprises: a mode confirming submodule, configured to judge whether a current service of a mobile terminal which accesses a base station is a non-high speed transmission service, if yes, then trigger a configuring submodule to configure corresponding frequency resource of a narrowband mode for the mobile terminal; and the configuring submodule, configured to allocate more than one subcarriers to the mobile terminal, generate a control signal which indicates the more than one subcarriers, and control the radio frequency module to send the control signal to the mobile terminal, wherein the more than one subcarriers are used for service data transmission and the difference between the highest frequency $FRE_{High}$ and the lowest frequency $FRE_{Low}$ in the more than one subcarriers does not exceed a threshold value $TH_B$.

A base station including the above transmitter is provided according to still another aspect of the present invention.

By using the above technical solution of the present invention, the base station can configure the user to be under a narrowband receiving mode with low power consumption. The base station allocates a narrowband resource to the user to carry the service data thereof and informs the user of relevant scheduling information via the information of specific time frequency location; and the user receiver can achieve narrowband receiving by adaptively moving the center spectrum and filtering the narrowband signals out, thus making the signal bandwidth processed by the receiver narrow, making the digital sampling rate lower, making the calculation amount of the FFT module and relevant storage reduced, thus achieving the effect of reducing the power consumption overhead of the mobile terminal.

BRIEF DESCRIPTION OF THE ACCOMPANYING DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF THE EMBODIMENTS

The present invention will be described hereinafter in detail with reference to the accompanying drawings and in conjunction with embodiments. It needs to note that the embodiments of the present application and the features in the embodiments can be combined with each other if there is no conflict.

Embodiment I

Figure 4:
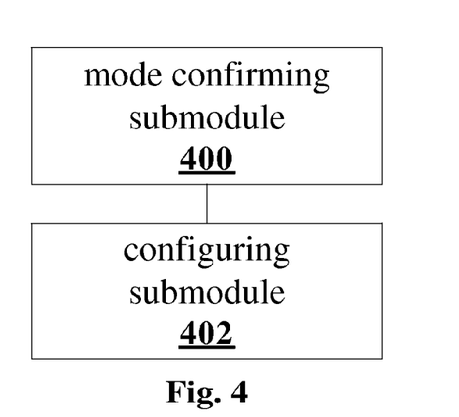
FIG. 4 is a structural block diagram of a transmitter according to embodiment I of the present invention.

In this embodiment, a transmitter is provided. As shown in FIG. 4, what is different from the prior art is, that a scheduling module of this transmitter includes a mode confirming submodule 400 and a configuring submodule 402, wherein the mode confirming submodule 400 is used for judging whether a current service of a terminal which accesses a base station is a non-high speed transmission service, if yes, then triggering the configuring submodule 402 to configure a corresponding frequency resource of a narrowband mode for the mobile terminal, otherwise confirming that the mobile terminal receives service data using the broadband mode;

the configuring submodule 402 is used for allocating more than one subcarriers for the service data transmission to the mobile terminal, generating a control signal which indicates the more than one subcarriers, and controlling the radio frequency module to send the control signal to the mobile terminal, wherein the difference between the highest frequency $FRE_{High}$ and the lowest frequency $FRE_{Low}$ in the more than one subcarriers does not exceed a threshold value $TH_B$.

The reason which causes currently existing mobile terminals to consume quite a lot of battery energy lies in the following: no matter whether the current mobile terminal is under a high rate service or a low rate service, the existing base station transmitter can only allocate broadband frequency resources to the mobile terminal, i.e. allocate broadband frequency resources to the mobile terminal all the time in the whole frequency band, which makes the modules such as RF, ADC, FFT, etc. of the receiver of existing mobile terminal to work under high data rate mode and receive service data with rather large power. As compared with the existing transmitter, the transmitter provided by this embodiment achieves mode judgment function and frequency domain resource configuration function by setting the above two submodules. The above transmitter allocates narrowband frequency resources to the mobile terminal which does not need to transmit service data at high speed, thus, the receiver of the mobile terminal can adjust the modules such as RF, ADC, FFT, etc. to receive service data with low power, which reduces the consumption of the electric quantity.

During the implementation, the above mode confirming submodule 400 judges the service type of the mobile terminal which currently accesses the base station, if the service type of the mobile terminal needs extremely high transmission speed, such as real-time video service or high speed file download service, then the above mode confirming submodule 400 confirms that this mobile terminal needs to use broadband mode to receive service data and allocate broadband frequency band resources to it. If the service type of the mobile terminal does not need extremely high transmission speed, such as services which are under low rate transmission state for a long time such as voice service, short message service, text browsing, etc., then the above mode confirming submodule 400 confirms that this mobile terminal uses the narrowband mode to receive service data and triggers the configuring submodule 402 to allocate narrowband frequency resources to this mobile terminal.

In the LTE system, 12 subcarriers form a frequency resource block (RB), and the basic unit for the frequency allocation is frequency resource block, and 1200 data subcarriers in a 20 MHz bandwidth are 100 RBs.

Figure 5:
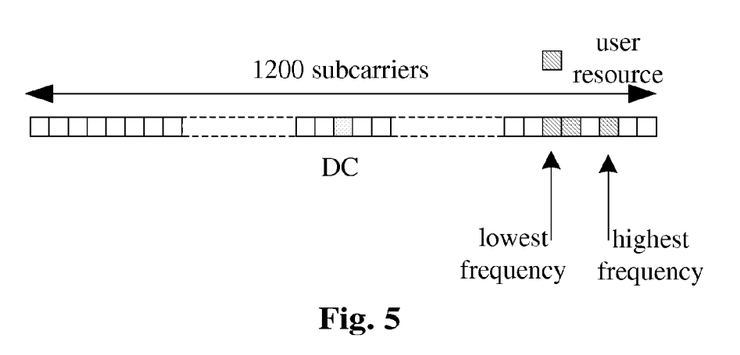
FIG. 5 is a schematic diagram of narrowband bandwidth spectrum allocation according to embodiment I of the present invention.

During the implementation, if the above mode confirming submodule 400 confirms that the above mobile terminal uses narrowband mode to receive service data, then the frequency resources allocated to it by the configuring submodule 402 is a narrowband which includes more than one subcarriers, and FIG. 5 gives out an example of narrowband allocation, assuming that the narrowband allocated to the voice service of one mobile terminal is: RBs the sequence numbers of which are 80, 81 and 83 (the numbers are 0, 1, . . . , 99 from low frequency to high frequency successively).

Preferably, the radio frequency module uses broadband mode or narrowband mode to send the control signal.

During the implementation, the broadband mode or narrowband mode can be selected for sending the control signal. If it is sent using the broadband mode, then the transmitter of the base station maps the control signal into any RB in the whole frequency band and sends the control signal, and if it is sent using the narrowband mode, the transmitter of the base station maps the control signal into the designated RB of the frequency band after scheduling and coordination by using the above frequency resource allocation mode and sends the control signal.

Sending control signal using narrowband mode enables the receiver of the mobile terminal to adjust modules such as RF, ADC, FFT, etc. to receive the control signal with low power, which makes the mobile terminal to be under low power consumption receiving state for a time period as long as possible, thus further reducing the consumption of the electric quantity of the mobile terminal.

Preferably, the scheduling module further includes: a sending control submodule 404 for controlling the radio frequency module to send the control signal at the timeslot $T_0+n*L$ and send service data within the timeslots between $T_0+n*L+1$ and $T_0+(n+1)*L$, wherein $T_0$ is a reference timeslot, $n \geq 0$, and $L \geq 0$.

During the implementation, the base station and mobile terminal can but not limited to negotiate, by the control signal, the mode judging timeslot, the transmission timeslot and the transmission period of the control signal and service data, thus the mobile terminal can timely and effectively adjust the receiving mode and can be under low power consumption state as much as possible.

In this embodiment, a base station is further provided. Besides of the functions of the existing base stations, the base station provided in this embodiment further includes any of the above transmitters provided by this embodiment for achieving mode judging function and frequency domain resource configuration function. As to those mobile terminals which do not need high speed to transmit service data, the above base station allocates narrowband frequency resources to it, thus the mobile terminal can adjust modules such as RF, ADC, FFT, etc. to receive service data with low power and the consumption of the electric quantity is reduced.

Embodiment II

Figure 6:
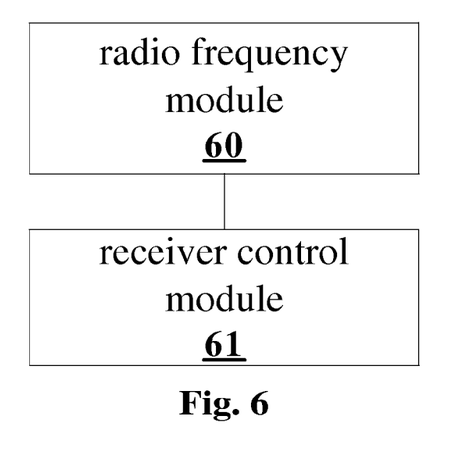
FIG. 6 is a structural schematic diagram of a receiver according to embodiment II of the present invention.

In this embodiment, a receiver is provided. As shown in FIG. 6, this receiver comprises: a radio frequency (RF) module 60 and a receiver control module 61, wherein the radio frequency module 60 is used for receiving a control signal sent from a base station which a mobile terminal accesses and outputting it (the control signal) to the receiver control module 61, and for receiving subsequent service data from the base station, wherein the control signal is used for indicating more than one subcarriers which are allocated to the mobile terminal for service data transmission; and the receiver control module 61 is used for judging whether the difference between the highest frequency $FRE_{High}$ and the lowest frequency $FRE_{Low}$ in the more than one subcarriers exceeds a threshold value $TH_B$, if the difference does not exceed the threshold value $TH_B$, then receiving the service data using a narrowband mode, otherwise receiving the service data using a broadband mode.

No matter whether the current service is a low rate service or a high rate service, the receivers of the existing mobile terminals need to set the working parameters of modules such as RF, ADC, FFT, etc. according to the system bandwidth of the cell and work under high data rate mode to receive service data with relatively large power. As compared to the existing transmitter, the receiver provided by this embodiment achieves the function of judging frequency resources and confirming the receiving mode by the above receiver control module 61; and as to those service data which do not need high speed to transmit, the above receiver sets the receiving mode to be narrowband receiving mode, thus the mobile terminal can adjust modules such as RF, ADC, FFT, etc. to receive service data with low power and the consumption of the electric quantity is reduced.

Figure 7:
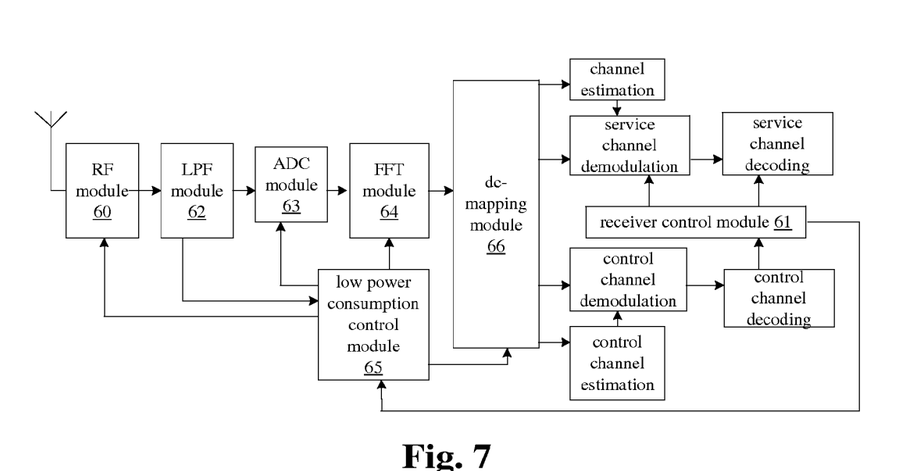
FIG. 7 is a preferred structural schematic diagram of a receiver according to embodiment II of the present invention.

Preferably, as shown in FIG. 7, the receiver provided by this embodiment can further comprise: a low pass filter (LPF) module 62, an analog digital converter (ADC) module 63, a Fourier transform (FFT) module 64, a low power consumption module 65, a de-mapping module 66, a channel estimation module 67, a demodulation module 68, and a decoding module 69, wherein the low power consumption module 65 is in connection with the radio frequency module 60, low pass filter module 62, analog digital converter module 63, and Fourier transform module 64 respectively and is used for configuring, under the control of the receiver control module 61, the working parameters of the radio frequency module 60, low pass filter module 62, analog digital converter module 63, and Fourier transform module 64 under the narrowband working mode. The radio frequency module 60, low pass filter module 62, analog digital module 63, and Fourier transform module 64 can receive and process the service data with low power after being configured with working parameters under the narrowband working mode, and the functions of other modules are the same as those of the corresponding modules in the existing receiver.

By setting the above low power consumption control module 65 in the receiver and configuring the low power working parameters of the radio frequency module 60, low pass filter module 62, analog digital module 63, and Fourier transform module 64 under the narrowband mode in response to the narrowband receiving mode requirement of the receiver control module 61, the receiver can is self-adaptive to various signal bandwidths. As to low rate services, for example services such as voice service, text browsing, etc., the receiver which is under low power working state can effectively save the battery consumption of the mobile terminal and prolong the usage time of the battery.

During the implementation, the following working parameters are generally configured for the radio frequency module 60, low pass filter module 62, analog digital converter module 63, and Fourier transform module 64 under the broadband mode:

(1) configuring the center frequency fc of the radio frequency module;

(2) configuring the passband of the low pass filter module to be the bandwidth of the system where the mobile terminal is located;

(3) configuring the sampling frequency $f_s$ of the analog digital converter module; and (4) configuring the transform size N of the Fourier transform module.

Preferably, the receiver control module 61 or low power consumption control module 65 can but not limited to configure the working parameters of the radio frequency module 60, low pass filter module 62, analog digital module 63, and Fourier transform module 64 under the narrowband mode by the following manners:

(1) configuring the center frequency of the radio frequency module to be as follows:

$$F_C = fc + \frac{(FRE_{High} + FRE_{Low})}{2},$$

wherein fc is the center frequency of the radio frequency module under the broadband mode;

(2) configuring the sampling frequency of the analog digital converter module to be as follows: $Fs=f_s/M$, wherein $f_s$ is the sampling frequency of the analog digital converter module under the broadband mode, $M=2^n$ and the value thereof is the minimum integer which makes $Fs>(1+r)B$ right, wherein $B=FRE_{High}-FRE_{Low}$, and r is a receiver working parameter and is a positive decimal;

(3) configuring the passband of the low pass filter module to be as follows: $B=FRE_{High}-FRE_{Low}$ and configuring the stop-band (or stopband) of the low pass filter module to be less than Fs; and (4) configuring the transform size of the Fourier transform module to be as follows: N'=N/M, wherein N is the transform size of the Fourier transform module under the broadband mode.

By way of the above parameter configuration mode, the receiver of the mobile terminal can adjust modules such as RF, ADC, FFT, etc. to receive service data with low power, thus achieving to receive service data with low rate service under the narrowband mode and reducing the consumption of the electric quantity.

Preferably, the radio frequency module 60 can use the broadband mode or the narrowband mode to receive the control signal.

During the implementation, not only the service data can be received using the narrowband mode, likewise, for further reducing the battery consumption of the mobile terminal, the control signal can also be received using the narrowband mode. That is, the receiver of the mobile terminal maps the control signal into one certain frequency range of the whole frequency band by the previously received control signal or artificially negotiating the frequency resources which will be allocated to the control signal with the base station transmitter. The receiver configures the working parameters of the radio frequency module 60, low pass filter module 62, analog digital converter module 63, and Fourier transform module 64 according to the characteristics of the frequency resources and self-adaptively adjusts the power consumption of the receiver, thus making the receiver to be under low power consumption state as much as possible and further reducing the battery consumption of the mobile terminal.

Preferably, the radio frequency module 60 receives the control signal at the timeslot $T_0+n*L$ and receives service date within the timeslots between $T_0+n*L+1$ and $T_0+(n+1)*L$, wherein $T_0$ is a reference timeslot, $n≥0$, and $L≥0$.

During the implementation, the base station and mobile terminal can but not limited to negotiate the mode judging timeslot, the transmission timeslot and the transmission period of the control signal and service data, thus the mobile terminal can timely and effectively adjust the receiving mode and can be under low power consumption state as much as possible.

In this embodiment, a mobile terminal is further provided. Besides of the functions of the existing mobile terminal, the mobile terminal provided by this embodiment further comprises any of the above receivers provided by this embodiment for achieving the frequency resource judgment function, receiving mode selection function and receiver working parameter configuration function. If the current mobile terminal judges that it does not need to transmit service data at high speed, then this mobile terminal sets the receiving mode as narrowband mode and configures the working parameters of each module under the narrowband mode, thus the mobile terminal is enable to adjust modules such as RF, ADC, FFT, etc. to receive service data with low power and reduce the consumption of the electric quantity as much as possible.

Embodiment III

Figure 8:
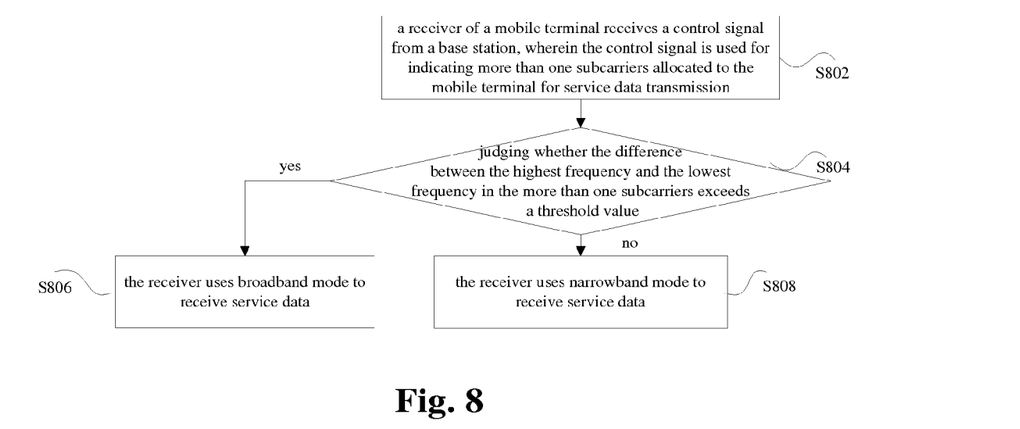
FIG. 8 is a flow chart of a method for service data transmission according to embodiment III of the present invention.

In this embodiment, a method for service data transmission is provided so as to achieve the functions of the base station transmitter and mobile terminal receiver in the above embodiments I and II. FIG. 8 is a flow chart of a method for service data transmission according to embodiment III of the present invention, which comprises:

Step S802: a receiver of a mobile terminal receives a control signal from a base station, wherein the control signal is used for indicating more than one subcarriers allocated to the mobile terminal for service data transmission;

Step S804: it is judged whether the difference between the highest frequency $FRE_{High}$ and the lowest frequency $FRE_{Low}$ in more than one subcarriers exceeds a threshold value $TH_B$. If yes, then step S806 is executed, otherwise the step S808 is executed;

Step S806: the receiver uses broadband mode to receive service data; and

Step S808: the receiver uses narrowband mode to receive service data.

In the existing method for service data transmission, no matter whether the current service is a low rate service or a high rate service, the receivers of the existing mobile terminals need to set the working parameters of modules such as RF, ADC, FFT, etc. according to the system bandwidth of the cell and can only work under high data rate mode to receive service data with relatively large power. As compared with relevant art, in the method for service data transmission provided by this embodiment, as to those service data which do not need to be transmitted at high speed, the receiver sets the receiving mode as narrowband mode by the function of judging frequency resources and confirming the receiving mode achieved by the receiver, thus enabling the receiver of the mobile terminal to adjust modules such as RF, ADC, FFT, etc. to receive service data with low power and reducing the consumption of the electric quantity of the mobile terminal as much as possible.

Figure 9:
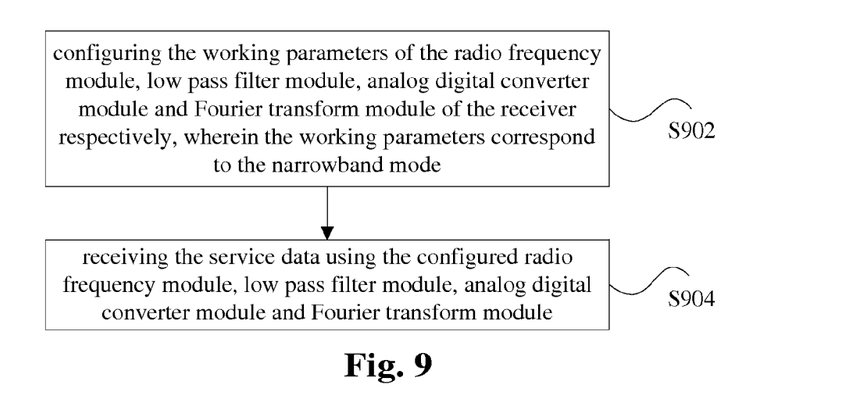
FIG. 9 is a flow chart of receiving service data under the narrowband mode according to embodiment III of the present invention.

Preferably, as shown in FIG. 9, the steps of receive service data by the receiver using narrowband mode comprise:

Step S902: configuring the working parameters of the radio frequency module, low pass filter module, analog digital converter module and Fourier transform module of the receiver respectively, wherein the working parameters correspond to the narrowband mode; and During the implementation, after having confirmed to use narrowband receiving mode to receive service data, the receiver configures the low power working parameters of the radio frequency module, low pass filter module, analog digital module, and Fourier transform module under the narrowband mode, which enables the receiver to be self-adaptive to various signal bandwidths. As to low rate services, for example services such as voice service, text browsing, etc., the receiver which is under low power working state can effectively save the battery consumption of the mobile terminal and prolong the usage time of the battery.

Step S904: receiving the service data using the configured radio frequency module, low pass filter module, analog digital converter module and Fourier transform module.

After having completed the above parameter configuration of narrowband mode, the radio frequency module of the receiver receives signals. The signals are processed by the down conversion (in frequency) and are low pass filtered by the low pass filter, then are sampled by the analog digital converter module, and are sent to the Fourier transform module processing module. After having obtained frequency domain data, normal channel estimation which is based on time frequency domain interpolation filtering is carried out and then demodulation and decoding are carried out thereon. Till then, the receiving of service data under the narrowband mode is completed.

During the implementation, the following working parameters are generally configured for the radio frequency module, low pass filter module, analog digital module, and Fourier transform module under the broadband mode:

(1) configuring the center frequency fc of the radio frequency module;

(2) configuring the passband of the low pass filter module to be the bandwidth of the system where the mobile terminal is located;

(3) configuring the sampling frequency $f_s$ of the analog digital converter module; and (4) configuring the transform size N of the Fourier transform module.

Preferably, the receiver can but not limited to configure the working parameters of the radio frequency module, low pass filter module, analog digital module, and Fourier transform module under the narrowband mode by the following manners:

(1) configuring the center frequency of the radio frequency module to be as follows:

$$F_C = fc + \frac{(FRE_{High} + FRE_{Low})}{2},$$

wherein fc is the center frequency of the radio frequency module under the broadband mode;

(2) configuring the sampling frequency of the analog digital converter module to be as follows: $Fs=f_s/M$, wherein $f_s$ is the sampling frequency of the analog digital converter module under the broadband mode, $M=2^n$ and the value thereof is the minimum integer which makes $Fs>(1+r)B$ right, wherein $B=FRE_{High}-FRE_{Low}$, and r is a receiver working parameter and is a positive decimal; and (3) configuring the passband of the low pass filter to be as follows: $B=FRE_{High}-FRE_{Low}$ and configuring the stop-band of the low pass filter to be less than Fs; and (4) configuring the transform size of the Fourier transform module to be as follows: $N'=N/M$, wherein N is the transform size of the Fourier transform module under the broadband mode.

By way of the above parameter configuration mode, the receiver of the mobile terminal can adjust modules such as RF, ADC, FFT, etc. to receive service data with low power, thus achieving to receive service data with low rate service under the narrowband mode and reducing the consumption of the electric quantity.

Preferably, the receiver can use broadband mode or narrowband mode to receive the control signal.

During the implementation, not only the service data can be received using narrowband mode, likewise, for further reducing the battery consumption of the mobile terminal, the control signal can also be received using narrowband mode. That is, the receiver of the mobile terminal maps the control signal into one certain frequency range of the whole frequency band by the previously received control signal or artificially negotiating the frequency resources which will be allocated to the control signal with the base station transmitter. The receiver configures the working parameters of the radio frequency module, low pass filter module, analog digital converter module, and Fourier transform module according to the characteristics of the frequency resources and self-adaptively adjusts the power consumption of the receiver, thus making the receiver to be under low power consumption state as much as possible and further reducing the battery consumption of the mobile terminal.

Preferably, the radio frequency module receives the control signal at the timeslot $T_0+n*L$ and receives service date within the timeslots between $T_0+n*L+1$ and $T_0+(n+1)*L$, wherein $T_0$ is a reference timeslot, $n≥0$, and $L≥0$.

During the implementation, the base station and mobile terminal can but not limited to negotiate the mode judging timeslot, the transmission timeslot and the transmission period of the control signal and service data, thus the mobile terminal can timely and effectively adjust the receiving mode and can be under low power consumption state as much as possible.

Embodiment IV

This embodiment describes embodiments I, II, and III using a particular example in detail.

Figure 10:
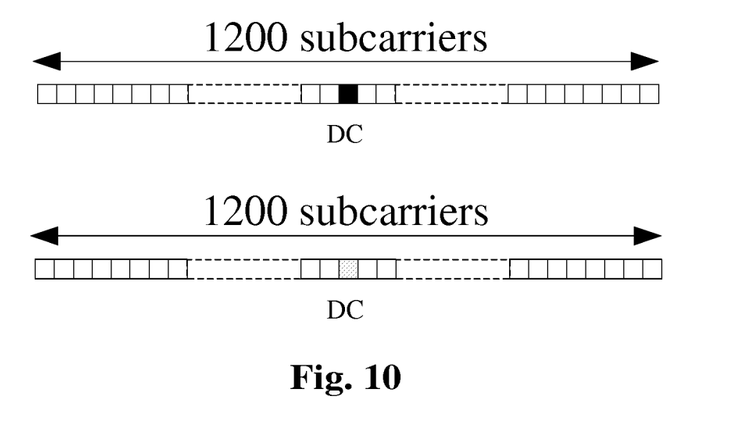
FIG. 10 is a schematic diagram of all-frequency bandwidth spectrum allocation according to embodiment IV of the present invention.

It is assumed that the system bandwidth is 20 MHz (the system frequency band of LTE), in the receiver with an all-frequency band (i.e. the above broadband mode), the center frequency is fc, the baseband sampling rate is fs=30.72 MHz, the FFT transform of 2048 points is completed within the FFT module, 1200 frequency domain subcarriers the center of which is DC in the frequency domain carry data (not including DC subcarrier), the subcarrier spacing is 15 kHz, and an example of all-frequency bandwidth allocation is as shown in FIG. 10.

Figure 11:
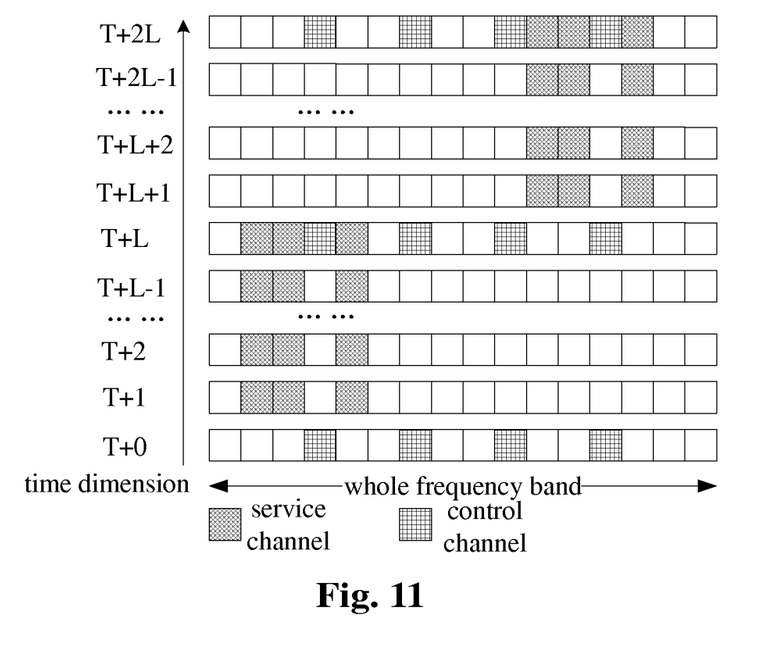
FIG. 11 is a diagram of time frequency resource scheduling according to embodiment IV of the present invention.

As the example of narrowband allocation shown in FIG. 5, it is assumed that the sequence number of the frequency resource block RB of the narrowband allocated to a voice service user by the base station are 80, 81, and 83 (the numbers are 0, 1, . . . , 99 successively from low frequency to high frequency). As shown in FIG. 11, the base station transfers the channel allocation information to the user via the control channel at timeslot T=0 (such one timeslot is 1 ms). After L ms (i.e. L timeslots, the value of L can be decided according to the change speed of the user channel, and the slower the change is, the smaller this value is) subsequently, the base station can schedule the user again and send relevant control channel information.

At timeslot T=0, the user uses broadband mode to receive control channel information.

The spectrum starting point and ending point obtained by the user are respectively:

freqLow=((80−50)*12+1)*15/1000=5.415 MHz freqHigh=((83−50)*12)*15/1000=5.940 MHz Note: here only the maximum value and minimum value of the frequency domain resources allocated to the user are concerned, and there can be vacancy resource blocks therebetween.

This bandwidth allocation information is generally obtained from the control signal, for example, the base station can inform the user by relevant physical channel or relevant signaling that the resources will be allocated to the user at a future moment or during a future time period. For example, as to the voice service of one certain user, the base station can semi-consecutively allocate a fixed bandwidth to the user during the call. After the user has obtained relevant information of the bandwidth, the control module of the receiver can judge whether to enter narrowband receiving mode.

Setting Th$B$=$B$system/4=5 MHz,

Since $B$=freqHigh−freqLow=5.940−5.415=0.525 MHz<Th$B$, the user will enter narrowband receiving mode.

The control module of the receiver sets the following parameters for modules such as RF, LPF, ADC, FFT, etc.:

the center frequency of the local oscillator in the RF is set as fc+(FreqHigh+FreqLow)/2=$fc$+5.6775 MHz;

the passband of anti-aliasing filter is set as B=0.525 MHz;

setting r=0.2, then M<fs/(1+r)/B=48.7 and taking M=$2^5$=32;

the new sampling rate of ADC is Fs'=fs/M=0.96 MHz;

the stop-band of the anti-aliasing filter is less than the Fs'; and the size of FFT transform is set as N'=N/M=64.

After the setting of the parameters of each module is completed, the signals are sampled by the RF, LPF, and ADC, then enter the FFT module to obtain frequency domain data, and all the data of RBs with number of 80, 81, and 83 in the original spectrum are received by the receiver without omission. The de-mapping module correspondingly separates reference signals for channel estimation and subcarrier signals for carrying data. The subsequent channel estimation module uses conventional frequency domain interpolation filtering method to carry out channel estimation. For improving the performance of channel estimation, it can be considered to receive the signals of more RB resource blocks which are adjacent to the useful bandwidth, so that more frequency domain reference signals can be used. For this end, it only needs to increase the value of r and then set the value of M to adjust the bandwidth of the receiving and processing signals. For example, if setting M=16 in this example, then the signal bandwidth for processing can increase to 1.25 MHz, which corresponds to 10 RB resource blocks, so that more reference signal subcarriers can be provided and then channel estimation accuracy is improved.

After the channel estimation is completed, the demodulation module carries out demodulation on the data over the subcarriers and sends the same to the decoder to make them decoded, and thus the receiving of data within narrowband is completed.

It can be seen from the above process that the narrowband receiver completes the receiving of data. However, as compared with the all-bandwidth receiver, the processing complexity of its pre-stage processing module is reduced significantly, which is about 1/32 of the all-bandwidth receiver! Thus, the power consumption of the receiver will be reduced significantly and the working life of the mobile device battery will be prolonged.

At the same time, this receiver is self-adaptively controlled. In some situations, although the service of a user is narrowband low speed service, for other purposes, the user can still freely select narrowband receiving or all-bandwidth receiving. For example, the base station will make the receiver estimate the quality of downlink channels irregularly or periodically, and at these moments, the user receiver can select all-bandwidth receiving mode.

By using the above technical solution provided by the embodiments of the present invention, the base station can configure the user to be under a low power consumption narrowband receiving mode, and the base station allocates a narrowband resource to the user to carry the service data thereof and informs the user of relevant scheduling information via the information of specific time frequency location; and the user receiver can achieve narrowband receiving by self-adaptively moving the center spectrum and filtering the narrowband signals out, thus making the signal bandwidth processed by the receiver narrow, making the digital sampling rate lower, making the calculation amount of the FFT module and relevant storage reduced, thus achieving the effect of reducing the power consumption overhead of the mobile terminal.

Apparently, those skilled in the art shall understand that the above modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for service data transmission, comprising:

receiving, by a receiver of a mobile terminal, a control signal sent from a base station, wherein the control signal is used for indicating more than one subcarriers allocated to the mobile terminal and the more than one subcarriers are used for transmitting service data;

judging whether the difference between the highest frequency $FRE_{high}$ and the lowest frequency $FRE_{Low}$ in the more than one subcarriers exceeds a threshold value $TH_B$; and if the difference does not exceed the threshold value $TH_B$, then receiving, by the receiver, the service data using a narrowband mode, otherwise receiving, by the receiver, the service data using a broadband mode;

wherein the step of receiving, by the receiver, the service data using a narrowband mode comprises:

configuring working parameters of a radio frequency module, a low pass filter module, an analog digital converter module and a Fourier transform module of the receiver respectively, with the working parameters corresponding to the narrowband mode; and receiving the service data using the radio frequency module, low pass filter module, analog digital converter module and Fourier transform module the working parameters of which have been configured.

2. The method according to claim 1, wherein the step of configuring the working parameter of the radio frequency module comprises: configuring a center frequency of the radio frequency module to be as follows:

$$F_C = fc + \frac{(FRE_{High} + FRE_{Low})}{2},$$

wherein the fc is the center frequency of the radio frequency module under the broadband mode;

the step of configuring the working parameter of the analog digital converter module comprises: configuring sampling frequency of the analog digital converter module to be as follows: Fs =fs/M, wherein the fs is a sampling frequency of the analog digital converter module under the broadband mode, the M =$2^n$ and the value thereof is the minimum integer which makes Fs >(1+r)B right, wherein n is a positive integer, B =$FRE_{high}$ −$FRE_{Low}$, and r is a receiver working parameter;

the step of configuring the working parameters of the low pass filter module comprises: configuring a passband of the low pass filter module to be as follows: B =$FRE_{high}$ − $FRE_{Low}$ and configuring a stop-band of the low pass filter module to be less than the Fs; and the step of configuring the working parameter of the Fourier transform module comprises: configuring transform size of the Fourier transform module to be as follows: N'=N/M, wherein the N is the transform size of the Fourier transform module under the broadband mode.

3. The method according to claim 1, wherein the receiver receives the control signal using a broadband mode or a narrowband mode.

4. The method according to claim 1, wherein the control signal is received at the timeslot $T_0$ +n* L and the service data is received within the timeslots between $T_0$ +n*L+1 and $T_0$+ (n+1)* L, wherein $T_0$ is a reference timeslot, n≥0, and L≥0.

5. A receiver, comprising:

a radio frequency module, configured to receive a control signal sent from a base station which a mobile terminal accesses, and output the same to a receiver control module, and configured to receive subsequent service data from the base station, wherein the control signal is used for indicating more than one subcarriers allocated to the mobile terminal and the more than one subcarriers are used for transmitting service data; and the receiver control module, configured to judge whether the different between the highest frequency $FRE_{high}$ and the lowest frequency $FRE_{Low}$ in the more than one subcarriers exceeds a threshold value $TH_B$, if the difference does not exceed the threshold value $TH_B$, then receive the service data using a narrowband mode, otherwise receive the service data using a broadband mode;

the receiver further comprising:

a low pass filter module, an analog digital converter module, a Fourier transform module, a low power consumption control module, a de-mapping module, a channel estimation module, a demodulation module, and a decoding module, wherein the low power consumption control module is respectively in connection with the radio frequency module, the low pass filter module, the analog digital converter module and the Fourier transform module and is configured to respectively configure, under the control of the receiver control module, working parameters for the radio frequency module, the low pass filter module, the analog digital converter module and the Fourier transform module under a narrowband working mode.

6. The receiver according to claim 5, wherein the low power consumption control module is configured to configure the working parameter of the radio frequency module by the following: configuring a center frequency of the radio frequency module to be as follows:

$$F_C = fc + \frac{(FRE_{High} + FRE_{Low})}{2},$$

wherein the fc is the center frequency of the radio frequency module under the broadband mode;

the low power consumption control module is configured to configure the working parameter of the analog digital converter module by the following:

configuring a sampling frequency of the analog digital converter module to be as follows: Fs=fs/M, wherein the fs is a sampling frequency of the analog digital converter module under the broadband mode, the M=$2^n$ and the value thereof is the minimum integer which makes Fs> (1+r)B right, wherein B=$FRE_{High}$−$FRE_{Low}$, and r is a receiver working parameter;

the low power consumption control module is configured to configure the working parameters of the low pass filter module by the following: configuring passband of the low pass filter module to be as follows: B=$FRE_{high}$− $FRE_{Low}$ and configuring that stop-band of the low pass filter module is less than the Fs ; and the low power consumption control module is configured to configure the working parameter of the Fourier transform module by the following:

configuring transform size of the Fourier transform module to be as follows:

N'=N/M, wherein the N is the transform size of the Fourier transform module under the broadband mode.

7. A mobile terminal, comprising the receiver of claim 6.

8. The receiver according to claim 5, wherein the radio frequency module is configured to receive the control signal using a broadband mode or a narrowband mode.

9. A mobile terminal, comprising the receiver of claim 8.

10. The receiver according to claim 5, wherein the radio frequency module is configured to receive the control signal at timeslot $T_0+n*L$ and receive the service data within the timeslots between $T_0+n*L+1$ and $T_0+(n+1)*L$, wherein $T_0$ is a reference timeslot, $n \geq 0$, and $L \geq 0$.

11. A mobile terminal, comprising the receiver of claim 5.

12. A mobile terminal, comprising the receiver of claim 5.

13. A transmitter, comprising: an encoding mode, a debugging module, a mapping and multiplexing module, an inverse Fourier transform module, a digital analog converter module, a radio frequency module and a scheduling module, wherein the scheduling module comprises:
 a mode confirming submodule, configured to judge whether a current service of a mobile terminal which accesses a base station is a non-high speed transmission service, if yes, then trigger a configuring submodule to configure corresponding frequency resource of a narrowband mode for the mobile terminal; and
 the configuring submodule, configured to allocate more than one subcarriers to the mobile terminal, generate a control signal which indicates the more than one subcarriers, and control the radio frequency module to send the control signal to the mobile terminal, wherein the more than one subcarriers are used for service data transmission and the difference between the highest frequency $FRE_{high}$ and the lowest frequency $FRE_{Low}$ in the more than one subcarriers does not exceed a threshold value $TH_B$.

14. The transmitter according to claim 13, wherein the radio frequency module is configured to send the control signal using a broadband mode or a narrowband mode.

15. The transmitter according to claim 14, wherein the scheduling module further comprises:
 a sending control submodule, configured to control the radio frequency module to send the control signal at timeslot $T_0+n*L$ and send the service data within the timeslots between $T_0+n*L+1$ and $T_0+(n+1)*L$, wherein $T_0$ is a reference timeslot, $n \geq 0$, and $L \geq 0$.

16. A base station, comprising the transmitter of claim 14.

17. The transmitter according to claim 13, wherein the scheduling module further comprises:
 a sending control submodule, configured to control the radio frequency module to send the control signal at timeslot $T_0+n*L$ and send the service data within the timeslots between $T_0+n*L+1$ and $T_0+(n+1)*L$, wherein $T_0$ is a reference timeslot, $n \geq 0$, and $L \geq 0$.

18. A base station, comprising the transmitter of claim 13.

* * * * *